United States Patent [19]

Carra

[11] 4,236,489
[45] Dec. 2, 1980

[54] ANIMAL POOL WITH LIFT PLATFORM

[76] Inventor: James A. Carra, 1590 Sunrise Hwy., Copiaque, N.Y. 11726

[21] Appl. No.: 903,250

[22] Filed: May 5, 1978

[51] Int. Cl.³ ...................... A01K 29/00; A61D 11/00
[52] U.S. Cl. ................................................ 119/158
[58] Field of Search ................. 119/29, 156, 157, 158; 182/146

[56] References Cited

U.S. PATENT DOCUMENTS

| | | | |
|---|---|---|---|
| 780,011 | 1/1905 | Newberry | 119/158 |
| 3,598,088 | 8/1971 | Bowman et al. | 119/158 |
| 4,165,714 | 8/1979 | Weissman et al. | 119/158 |

FOREIGN PATENT DOCUMENTS

| | | | |
|---|---|---|---|
| 8015 | 1/1933 | Australia | 119/158 |
| 1388676 | 3/1975 | United Kingdom | 119/158 |
| 183892 | 8/1966 | U.S.S.R. | 119/158 |

*Primary Examiner*—Gene Mancene
*Attorney, Agent, or Firm*—Kane, Dalsimer, Kane, Sullivan and Kurucz

[57] ABSTRACT

A pool for animals, particularly horses, wherein the animal is lowered and raised by means of vertical movement of a lift platform into and out of a bath wherein whirlpool treatment can be effected or a swimming-in-place of the animal is effected.

1 Claim, 9 Drawing Figures

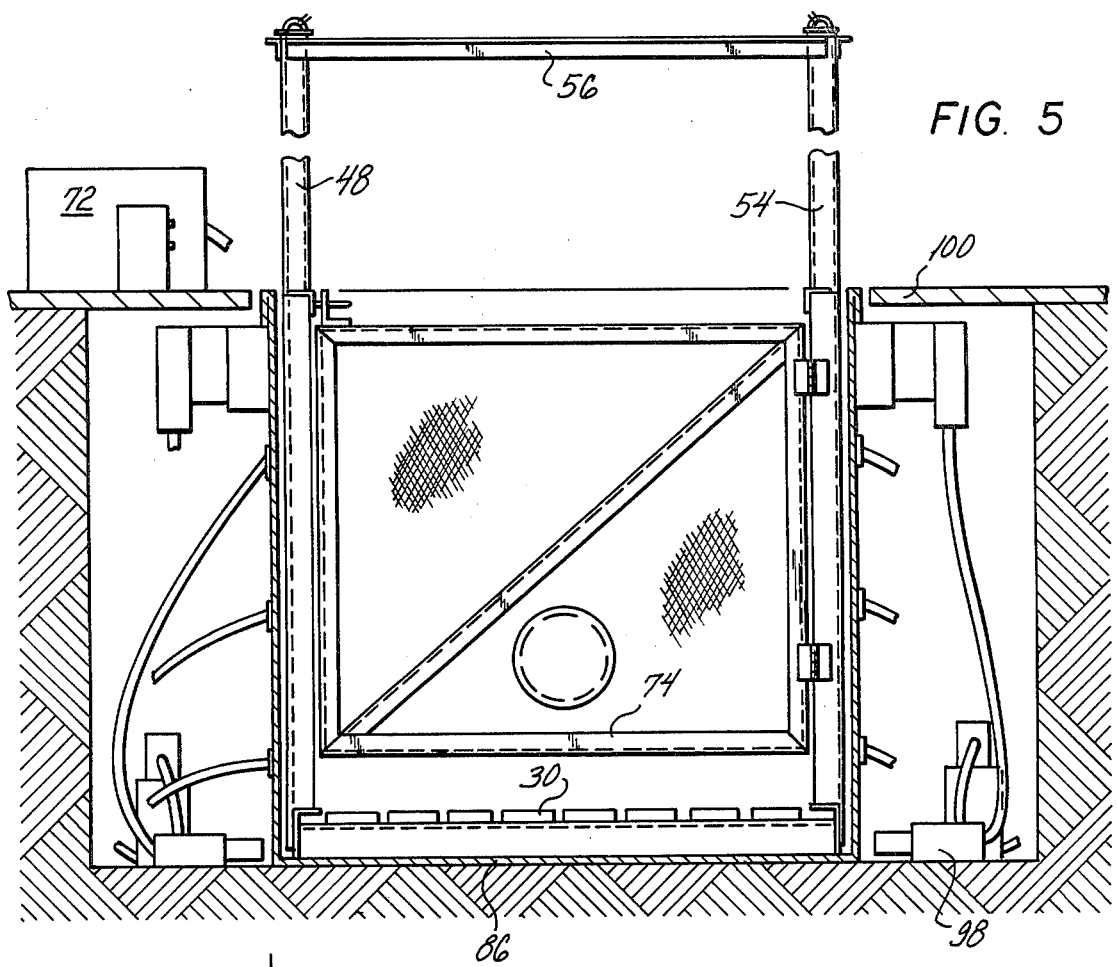
FIG. 5
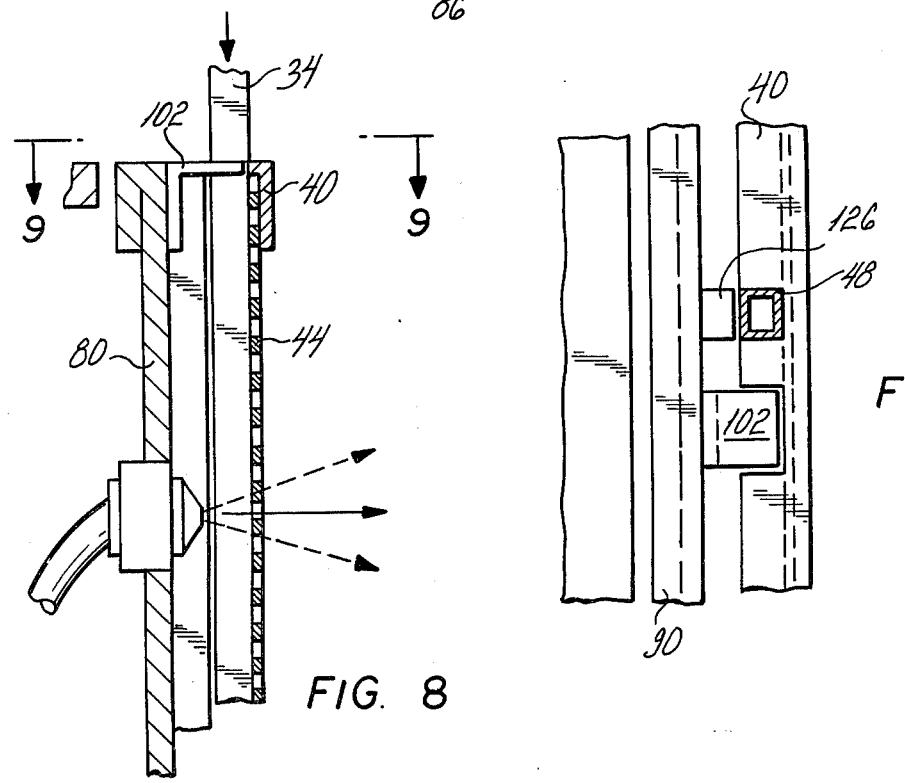
FIG. 8
FIG. 9

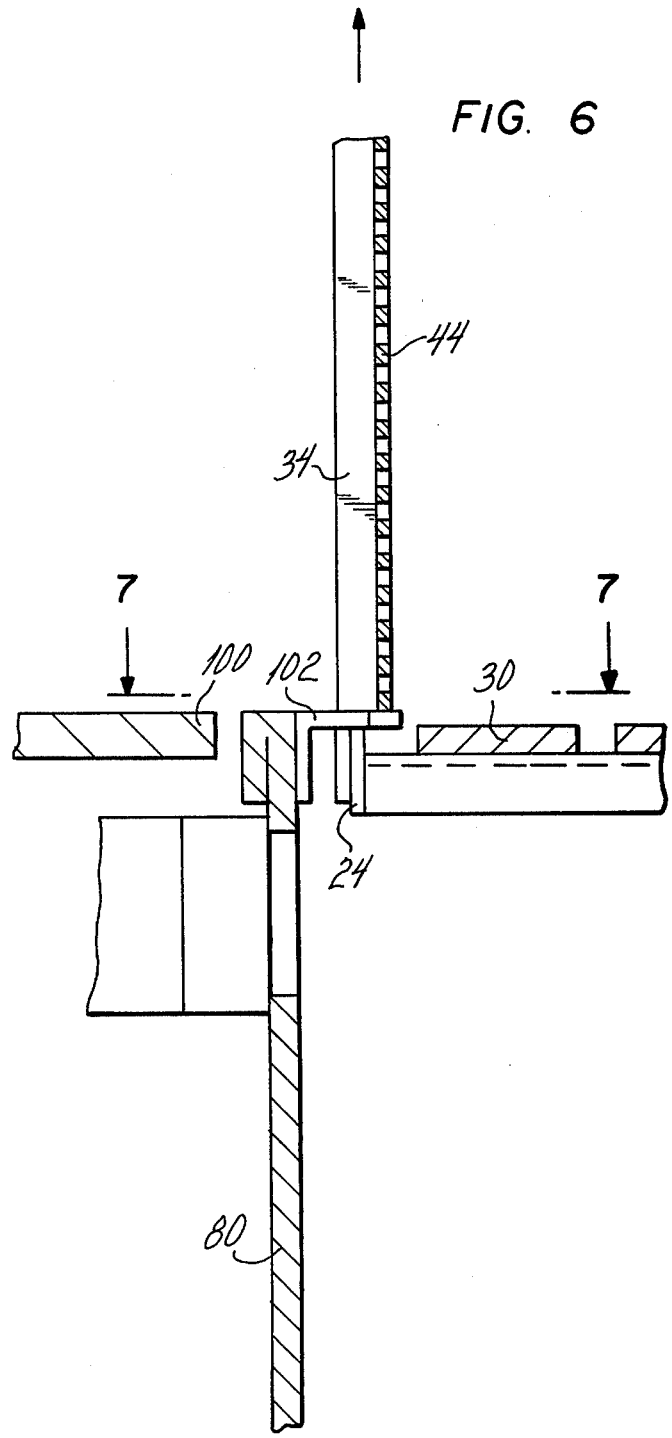
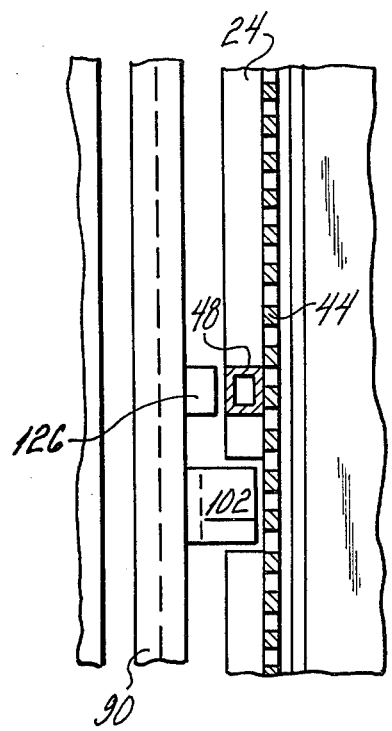

ANIMAL POOL WITH LIFT PLATFORM

BACKGROUND OF THE INVENTION

It has been recognized that it is beneficial to animals, and particularly horses, in the treatment of injuries or in general conditioning to immerse the injured portion of the animal in moving water such as a whirlpool.

Additionally it has been found with horses that negative effects can occur during relative inaction in winter months or in inclement weather where conditions prevent the horse from undergoing and participating in a regular exercise program. This can be remedied if facilities are available for the horse to exercise indoors. It has been found that provision of a pool in which the horse can swim is beneficial to maintaining the horse in a healthy condition under these circumstances.

Heretofore pools, which were used for these purposes and used for horses after a workout have been either of the walk-in type requiring ramps which utilized large space areas, expensive and complicated conveyor or hoist equipment which additionally frightened the horse.

SUMMARY OF THE INVENTION

A horse conditioning pool with lift platform which requires minimum space, is relatively inexpensive, simple to operate and comfortable for a horse and which can be utilized as a whirlpool or in a swimming-in-place application.

A BRIEF DESCRIPTION OF THE DRAWINGS

FIG. 5 is a transverse section of the lift in lowered position illustrating the guides;

FIG. 6 is a segmentary partially sectional view illustrating the platform stop mechanism incorporated in the lift platform assembly;

FIG. 7 is a partially sectional view taken along the line 7—7 in the direction of the arrows in FIG. 6;

FIG. 8 is a segmentary partially sectional view illustrating the spray; and

FIG. 9 is a sectional view taken along the line 9—9 in the direction of the arrows in FIG. 8 illustrating the guide structure incorporated in the lift platform assembly.

DESCRIPTION OF A PREFERRED EMBODIMENT

Figure 1:
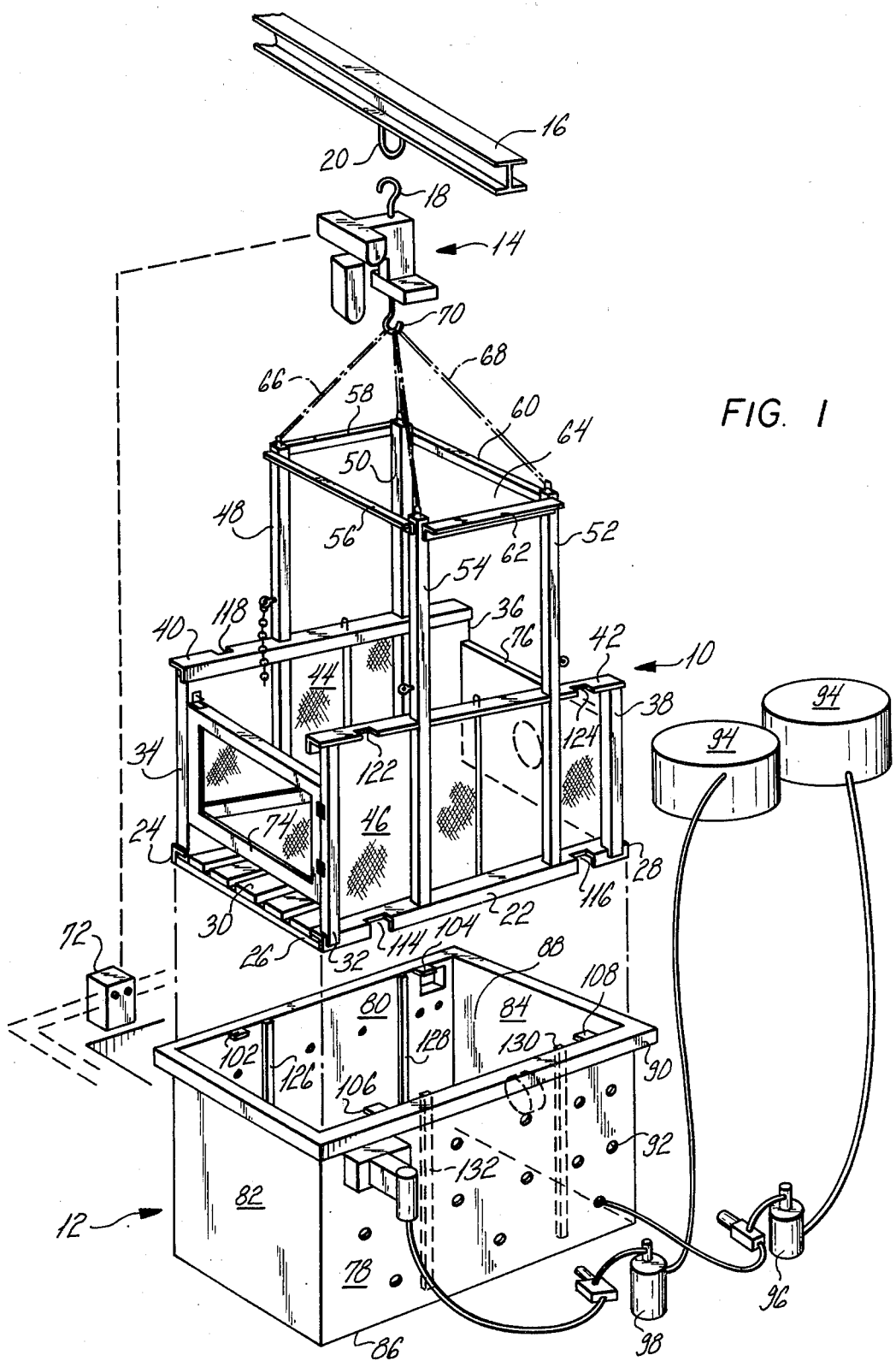
FIG. 1 is an exploded perspective view of a pool with lift platform constructed in accordance with the teachings of this invention.
Figure 2:
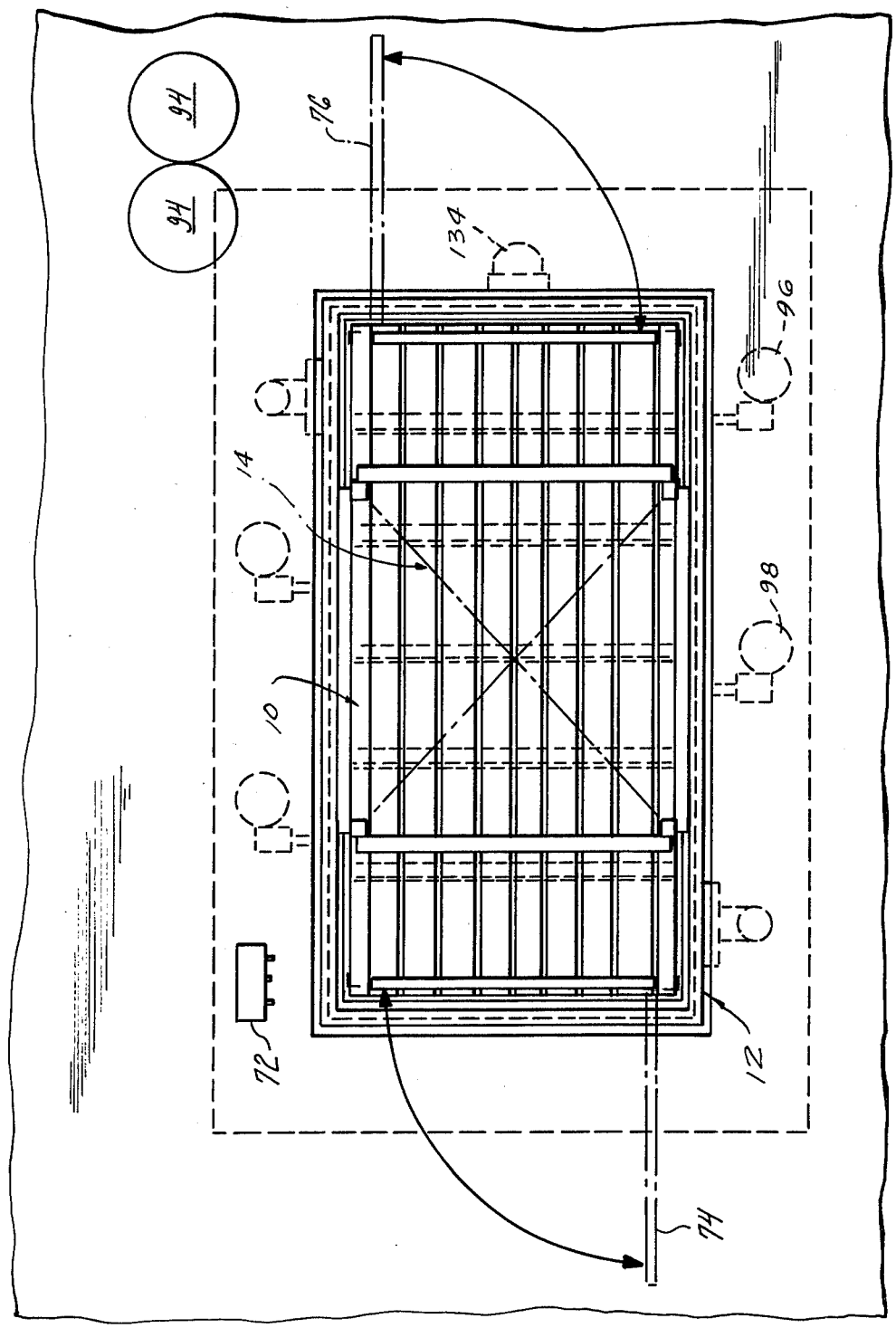
FIG. 2 is a view from above of the pool shown in FIG. 1 with the end doors shown in open position in broken lines.

The animal pool which is the subject of this invention includes as seen in FIG. 1 a lift platform 10, tank 12 and hoist mechanism 14 with a suitable support means such as horizontal I-beam 16 to which the hoist mechanism is attached by hook 18 and eye 20.

The lift platform 10 has a floor constructed of longitudinal side frame members 22 and 24 to which are attached transverse frame members 26 and 28 which support the ends of spaced, parallel, longitudinally disposed floor planks 30. As seen in end view in FIG. 5 for example the frame members 22 and 24 are angle irons to which the wooden transverse members 26 and 28 are attached at ends to support the wooden floor planking. Any suitable materials or methods of attachment can be used.

Vertical corner supports 32, 34, 36 and 38 have respective ends attached to the frame members 22 and 24 and as seen in the Figs project upwardly to support longitudinally disposed side bars 40 and 42 to provide lift platform sides 44 and 46. Bars 40 and 42, like frame members 22 and 24 are angle iron. The sides 44 and 46 can be left open, provided with grille work or filled in. In the preferred form of the invention cushioning members in the form of blankets or canvassing can be provided to protect horses in the lift from harm.

Vertical hoist supports 48, 50, 52 and 54, with lower ends attached to respective frame members 22 and 24 project upwardly through slots in members 40 and 42, above the sides. Angle iron members 56, 58, 60 and 62 are attached to the respective upper ends of hoist supports 48, 50, 52 and 54 to form a rectangular hoist frame 64 to which is attached chain members 66 and 68 received in hook 70 of hoist mechanism 14.

The hoist mechanism is any suitable mechanism commonly used for vertical lift purposes and in the preferred embodiment it is electrically controlled by controls 72. As stated above the hoist mechanism 14 is attached to support 16.

Each of doors 74 and 76 is hingedly attached to a respective side of the lift platform 10 at an end for outward pivotal movement about a vertical axis.

The tank 12 is substantially water tight having side walls 78 and 80, end walls 82 and 84, bottom wall 86 and open top 88 rimmed by outwardly projecting flange 90.

The tank 12 is provided with a plurality of nozzles 92 for projecting water inwardly from containers 94 for filling of the tank and/or spraying a horse on the lift platform in the unit as desired. Nozzles pump 96 is provided for this purpose. A suitable overflow pump 98 is also provided.

Figure 3:
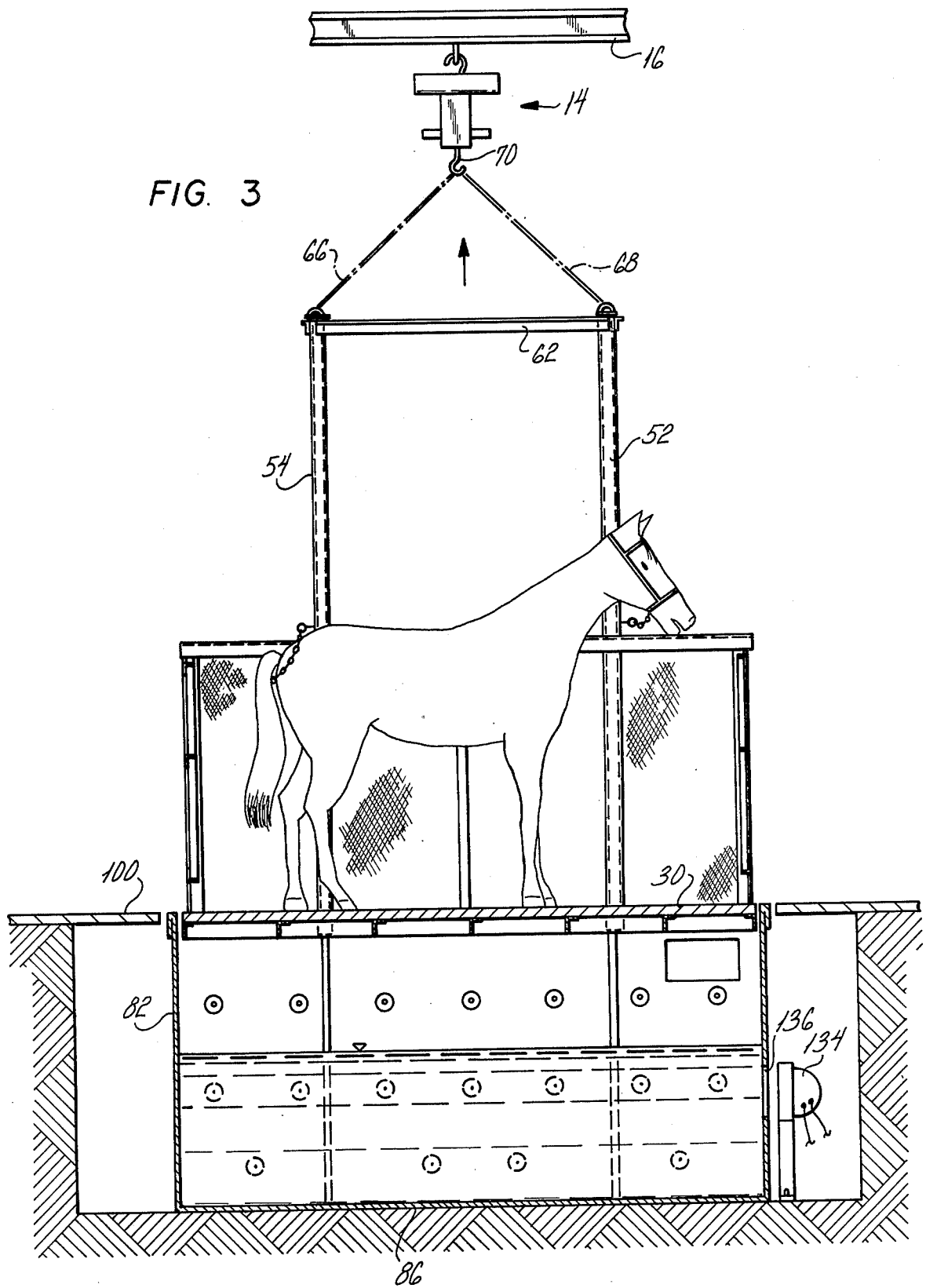
FIG. 3 is a side elevation of the pool with lift platform with the horse shown thereon prior to lowering of the lift.

Since it is proposed that the device be used for animals, such as horses, it is necessary that certain important features be included in order to avoid frightening or injuring the animal. As can be seen in FIG. 3, in the raised position of the device it is important that the floor boards 30 be level or lie in the same horizontal plane as the external ground surface 100. It is further important that as the horse enters or exits the lift platform rocking or swaying of the platform does not occur. This is especially important at the time the horse enters the platform, as such movement could frighten him.

In order to insure the above, I have provided horizontal holds for horse boarding. As seen in the Figs., inwardly directed hold flanges 102, 104, 106 and 108 are provided on the tank projecting inwardly from the rim 90. Corresponding hold flange receiving notches are placed in side bars 40 and 42 of the lift platform as well as in longitudinal side frame members 22 and 24 at the floor thereof. In the raised position flanges 106 and 108 shown in FIG. 1 are received respectively in hold notches 114 and 116 of frame member 22. Similar notches not seen in the Fig. are formed in member 24 to receive flanges 102 and 104. With the flanges so received in the notches, the floor 30 of the platform is clearly level with ground 100 and the platform is prevented from movement in a horizontal plane as a result of swinging or swaying.

Similarly to the above, in the lowered position of the platform flanges 106 and 108 are respectively received within notches 122 and 124 of side bar 42. Similar notches not seen in the Fig. are formed in member 40 to receive flanges 102 and 104. Thus swaying motion is prevented in the lowered position of the platform.

An additional important feature is included in my invention. Vertical guide bars 126, 128, 130 and 132 are provided on the inside surface of the tank side walls. Guide bars 126, 128, 130 and 132 are provided to respectively cooperate with hoist supports 48, 50, 52 and 54 of the lift platform providing a bearing surface during vertical movement of the platform. A lamp 134 may be provided as shown in FIG. 3 for illumination, as desired, through opening 136 in tank end wall 84.

Figure 4:
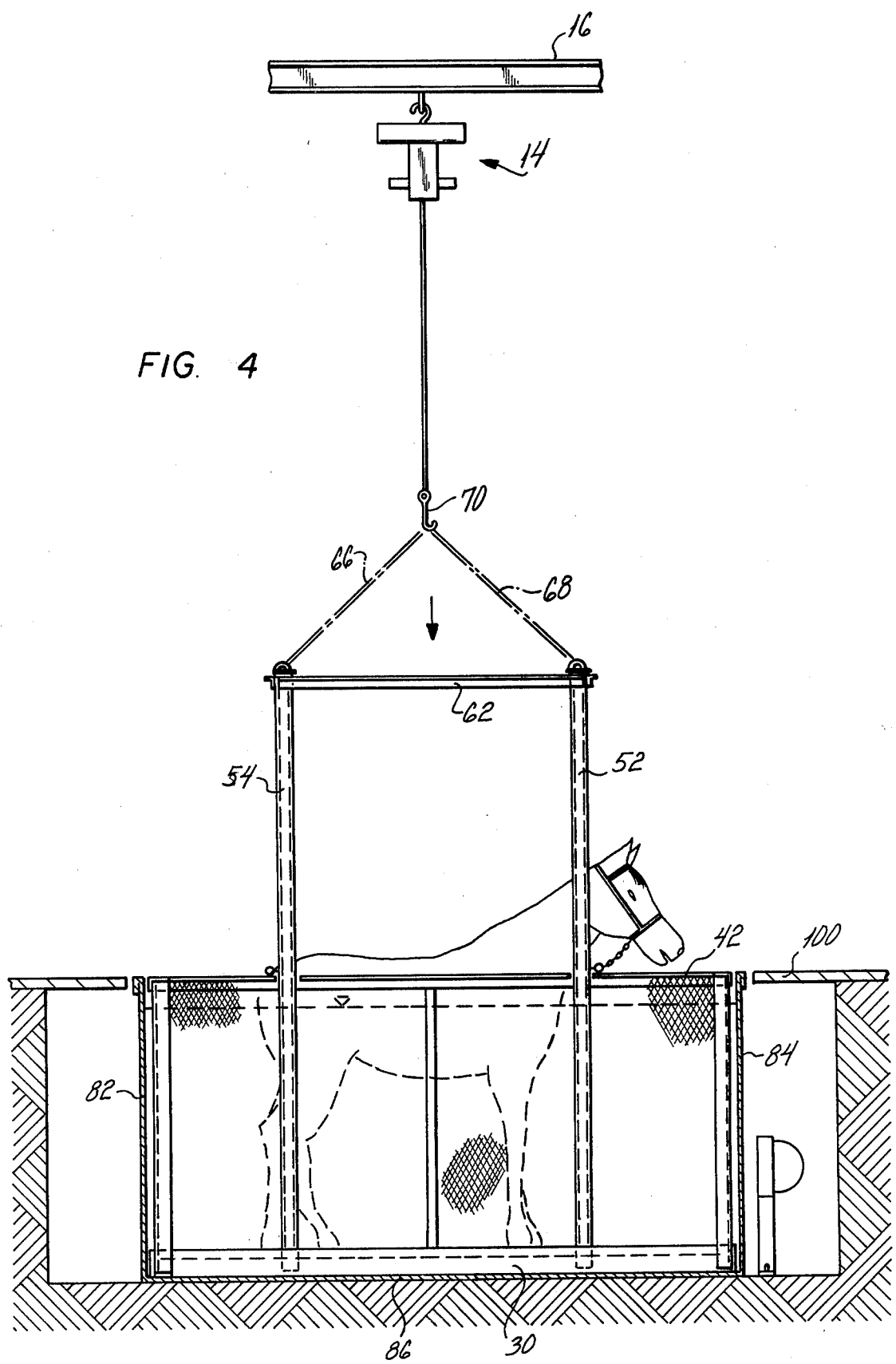
FIG. 4 is a view similar to FIG. 3 with the lift in lowered position.

In use, the horse or other animal is led on to and mounts the platform when it is in the raised position as shown in FIG. 3. The hoist can then be lowered to the position shown in FIG. 4 and the horse can receive a spray of liquid from the jets and/or be allowed to swim in place.

I claim:

1. An animal pool comprising;
   a substantially rectangular tank having an open top, first and second tank sidewalls and first and second tank end walls;
   a substantially horizontal lift platform having frame members for the floor and vertical corner supports and adapted to be raised or lowered through said open top to enter and exit said tank;
   said lift platform further comprising a floor, first and second sidewalls and first and second end doors;
   each of said end doors of said lift platform being rotatable about a vertical axis from a closed to an open position;
   hoist means extending upwardly from said lift platform to raise and lower said lift platform;
   hoist supports for said hoist means;
   an electrically controlled hoist mechanism for said hoist means;
   chain means interconnecting said hoist mechanism and said lift platform;
   horizontal hold means including inwardly projecting flanges and notches formed on said tank and said lift to cooperatively prevent relative horizontal movement of said lift platform, said notches receiving said projecting flanges to prevent said movement;
   said flanges being located at the top of said tank and said notches being located on said lift platform;
   bearing guide means for guiding said lift platform within said tank during vertical movement of said platform, said bearing guide means including vertical guide bars on the inside surface of said tank sidewalls and vertical supports of said platform cooperating therewith during vertical movement of said platform; and
   liquid spray means for placing liquid and spraying liquid in said tank.

* * * * *